3,152,280
OMEGATRON ELECTRODE ASSEMBLY
Martin S. Bloom, Norton-on-Tees, England, and Johannes Jakob Hirzel, Neuhausen am Rheinfall, Switzerland, assignors to Imperial Chemical Industries Limited, London, England, a corporation of Great Britain
Filed May 29, 1961, Ser. No. 113,268
Claims priority, application Great Britain, June 7, 1960, 19,926/60
4 Claims. (Cl. 313—243)

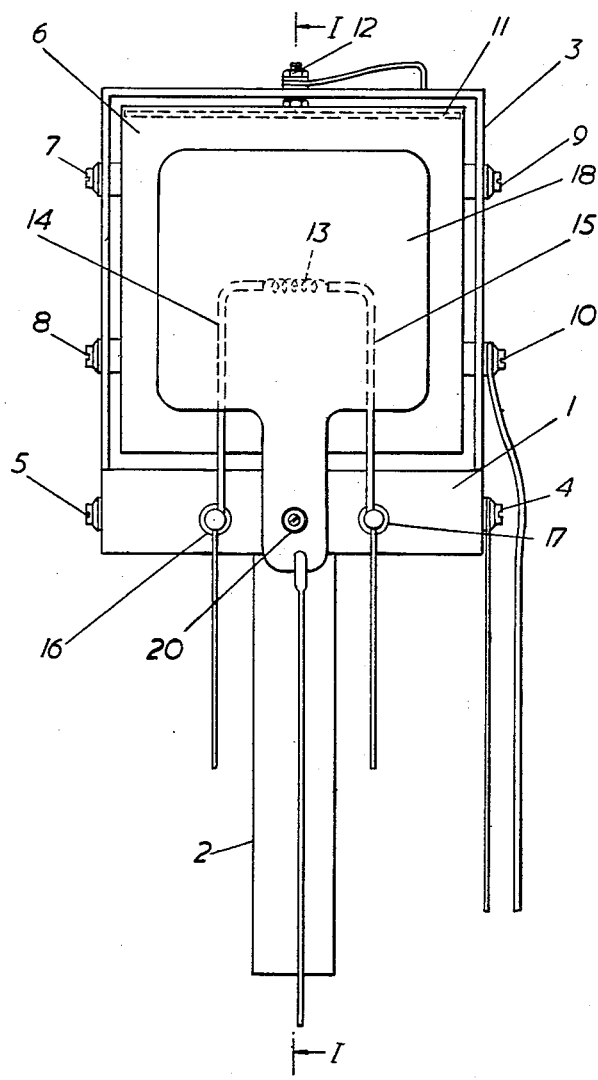

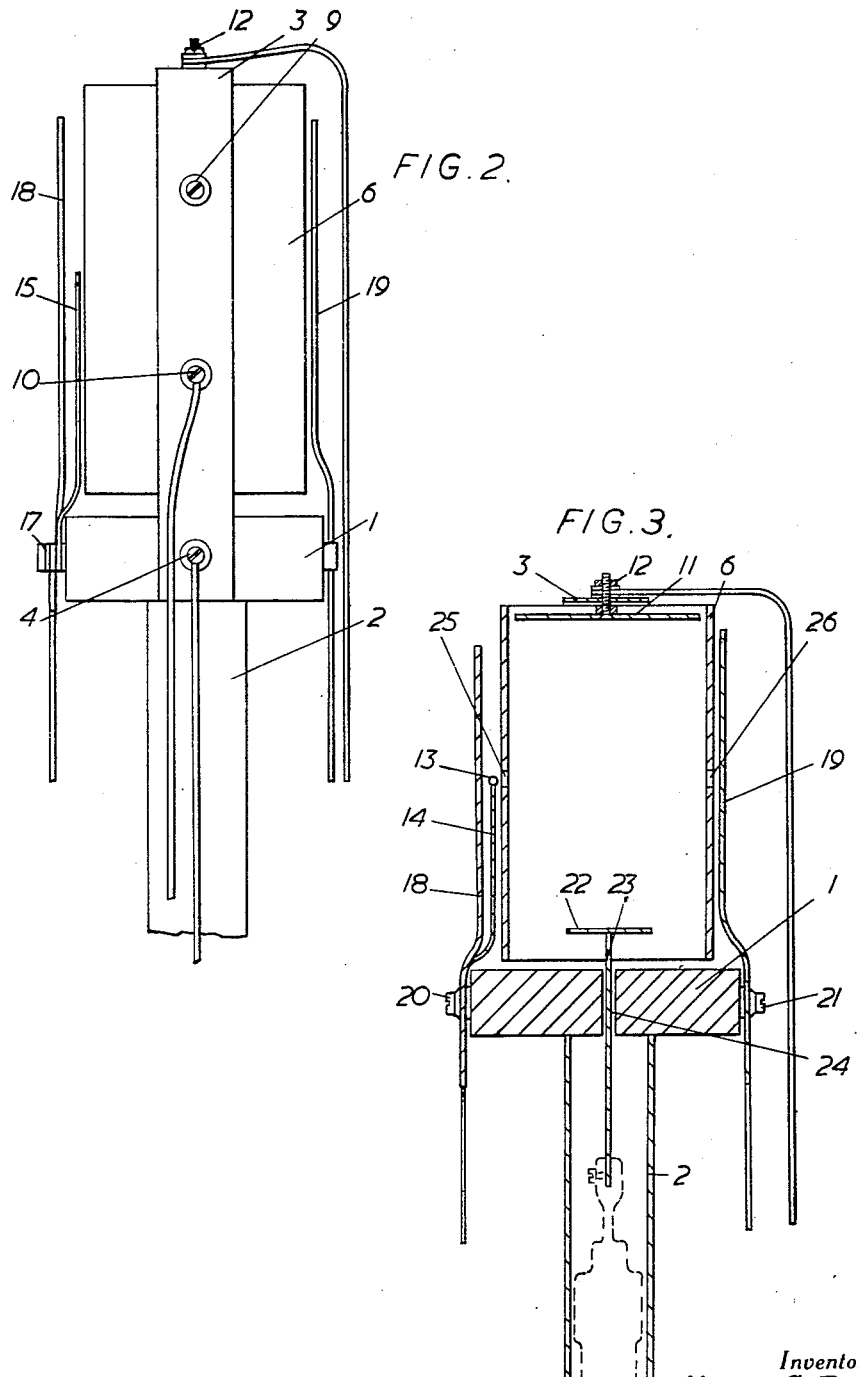

This invention relates to electronic vacuum tube devices, and in particular to omegatrons.

According to the invention there is provided an electrode assembly for an electronic vacuum tube device, comprising a block, a plurality of electrodes, means for securing the electrodes to the block in accurately determined positions with respect to each other and with respect to the block, means, where necessary, for insulating the electrodes from the block, and means for connecting leads to the electrodes.

The term "electrode" is intended to include any electrical component of an electronic vacuum tube device, such as for example an anode, cathode, grid, filament, filament back plate, electron collector, radio frequency plate, ion collector or screen.

The electrode assembly preferably includes means for fixing the block in a desired position with respect to a base for the electronic vacuum tube device. This means may conveniently comprise a tube attached to the block and adapted to engage, for example by means of a push fit, a member secured to the said base.

The block may be made of metal and may itself constitute an electrode. It may conveniently be an electrode which is intended to be earthed.

An electrode may be secured directly to the block or to a supporting member or members secured to the block. Parts may conveniently be secured to each other by means of studs or nuts and bolts, and, where desirable, may be spaced and insulated from each other by means of insulating washers. Such washers are preferably made of a hard material which is capable of being cut accurately to desired sizes, which is capable of withstanding high temperatures, and which is "clean" in a vacuum system—i.e. is a poor absorber and desorber of gases. A particularly suitable material is sapphire, which, in the interests of economy, is preferably of the synthetic variety.

Each washer is preferably held under compression by means of a spring washer, thus avoiding the necessity of having the appropriate stud or nut and bolt too tight.

Each spacing and insulating washer may conveniently be located in recesses in the two parts which it separates. This arrangement facilitates accurate positioning of parts with respect to each other; and, as the recesses and washers can be cut accurately to desired sizes, parts may be made readily replaceable.

Leads to the electrodes may be held in position by means of studs or nuts and bolts, which may conveniently serve the purpose of securing electrical components of the electrode assembly to each other. Where necessary the leads may be insulated from such studs or nuts and bolts by means of insulating washers.

Electrode assemblies according to the invention have the advantages that they are robust, may easily and directly be assembled without, for example, the use of jigs, do not readily vibrate, individual components thereof are readily replaceable, they may be accurately positioned with respect to a base, they may be constructed so as to be interchangeable, and they may be operated at an elevated temperature (for example up to 400° C.).

The electrode assemblies are preferably mounted on bases according to the invention described in our copending application Serial No. 113,520, filed May 29, 1961, and are readily demountable therefrom.

The invention is especially applicable to the construction of an omegatron. Thus, for example, an electrode assembly as hereinbefore specified, suitable for use as a head of a simple omegatron of the non-divided field type, comprises two radio frequency plates, an open ended box structure which with the radio frequency plates encloses a rectangular ionisation and mass selection zone, a filament, with supports therefor, a filament back plate and an electron collector.

The dimensions of the space enclosed by the radio frequency plates and the said box structure are preferably in accordance with the invention disclosed in our copending application Serial No. 103,352, filed April 17, 1961.

The omegatron head may include an ion collector. Alternatively the ion collector may be separate from the head and mountable on a base, for example of the type described in our copending application Serial No. 113,520, the lead from the ion collector being taken through a hole in the metal block. In any case the ion collector is preferably one according to the invention described in our co-pending application Serial No. 103,353, filed April 17, 1961.

The block is preferably fixable with respect to the base by means of a tube attached to the block and adapted to engage, for example by means of a push fit, a member secured to the said base. This tube may conveniently serve as a screen for the lead from the ion collector.

The metal block supporting electrodes may itself serve as one of the radio frequency plates. The other radio frequency plate, and the said box structure, may conveniently be secured to a bracket, and insulated therefrom by means of insulating washers, in conjunction with spring washers, the bracket being secured to the block.

The filament supports, filament back plate and electron collector may conveniently be secured to the block and insulated therefrom by means of insulating washers, fitted with spring washers.

The filament should be disposed near an aperture in the box structure, and the electron collector should be disposed so as to collect electrons, which, during operation of the omegatron, pass in a beam through this aperture, across the inside of the box structure, and out through a corresponding aperture in the wall of the box structure opposite to that containing the first mentioned aperture.

In order that the omegatrons may satisfactorily be used at temperatures up to say 400° C., the metal parts of the omegatron head are preferably made of a metal which does not substantially change its mechanical properties at such temperatures.

For the better understanding of the invention one specific embodiment thereof, namely a head for a simple omegatron of the non-divided field type, is described with reference to the accompanying drawing in which:

FIGURE 1 is a side view, the filament and radio frequency plate being shown in dotted lines;

FIGURE 2 is an end view; and

FIGURE 3 is a section on the line I—I in FIGURE 1.

Referring to the drawings, the rectangular metal block 1 is attached to the end of a tube 2, which is adapted to be firmly fixed in position by a push fit on a member secured to a base for the omegatron. The base is preferably of the type described in our co-pending application Serial No. 113,520.

A bracket 3 is engaged by grooves in the ends of the block 1 and is secured thereto by means of screws 4 and 5. An open ended metal box structure 6, forming four walls of the ionisation and mass selection zone, is secured to the bracket by means of the four screws 7, 8, 9 and 10, being spaced and insulated from the bracket by means of sapphire washers. The radio frequency plate 11 is secured to the top of the bracket 3 by means of a nut and stud 12, and is spaced and insulated from the bracket by means of a sapphire washer.

The filament 13 is supported between stiff wires 14 and 15, which are clamped in position by means of the heads 16 and 17 of fixing screws which pass through holes in the block 1, being insulated therefrom by sapphire washers. The filament back plate 18 and the electron collector 19 are secured to the block 1 by means of studs 20 and 21 respectively, and, as with other components, are insulated from their support by means of sapphire washers. The filament is located near an aperture 25 in the wall of the box structure 7, through which an electron beam may pass; and the electron collector is located behind an aperture 26 in the opposite wall of the box structure, through which the electrons may escape.

All the sapphire washers are accurately cut to the correct size and fit closely in recesses in the appropriate parts of the omegatron head. This ensures that the head can be assembled easily, with each component accurately positioned. The sapphire washers are fitted with spring washers, so that compression may be applied to them without having the appropriate studs or nuts and bolts too tight.

Leads from the various electrodes mentioned above, i.e. filament, filament back plate, electron collector, metal walls of the ionisation and mass selection zone, "live" radio frequency plate and the metal block which serves as an earthed radio frequency plate, comprise stiff wires which are spot welded to tags held by nuts, or the heads of the appropriate fixing screws or studs, and where necessary insulated therefrom by means of insulating washers. These leads may conveniently be connected to terminals carried by the omegatron base, which preferably is of the type disclosed in our co-pending application Serial No. 113,520.

The ion collector 22, which is preferably one according to the invention disclosed in our co-pending application Serial No. 103,353, is joined to a lead and support 23, which passes through a hole 24 in the metal block 1 and is fixed in position by some suitable means, such as for example a terminal on a base of the type described in our co-pending application Seral No. 113,520. The lead is completely by the block 1 and tube 2, both of which are earthed.

The metal parts of the apparatus are made of a non-magnetic alloy which is not readily contaminated and which does not substantially change its mechanical properties up to say 400° C. The dimensions of the ionisation and mass selection zone are preferably in accordance with the invention disclosed in our co-pending application Serial No. 103,352.

We claim:

1. An electrode assembly for an electronic vacuum tube device, comprising a metal block serving as a radio frequency electrode, a second radio frequency electrode, an open ended box structure which with the radio frequency electrodes encloses a rectangular ionization and mass selection zone, the said second radio frequency electrode and box structure being secured to a bracket by means of insulating washers, and, secured to the block and insulated therefrom by means of insulating washers, a filament, a filament back plate and an electron collector, and means for removably and rigidly securing the electrodes to the block in accurately determined positions with respect to each other and with respect to the block, and means for connecting leads to the electrodes.

2. An electrode assembly for an omegatron comprising a shaped metal base block, an electron emitter and an electron collector electrode between which an electron beam is passed, an open box-shaped electrode having apertures for passage of the beam, two radio frequency electrodes which together with the open box-shaped electrode forms a rectangular ionization and mass selection zone, provision for insertion of an ion collector electrode and means for rigidly securing the electrodes to the block in accurately predetermined positions, the said base block being shaped to accommodate the said means so that the assembly may be assembled and accurately aligned thereon without the use of jigs.

3. An electrode assembly according to claim 2 in which there is also provided a rigid bracket mounted on the said shaped base block acting as one of the two radio frequency electrodes, the other radio frequency electrode and the open box structure being secured to the said rigid bracket.

4. An electrode assembly according to claim 2 wherein said shaped metal base block comprises one of said two radio frequency electrodes.

References Cited in the file of this patent

UNITED STATES PATENTS

| | | |
|---|---|---|
| 2,330,032 | Dailey | Sept. 21, 1943 |
| 2,420,207 | Smith | May 6, 1947 |
| 2,496,123 | East et al. | Jan. 31, 1950 |
| 2,521,656 | Segre et al. | Sept. 5, 1950 |
| 2,581,446 | Robinson | Jan. 8, 1952 |
| 2,583,121 | Reynolds | Jan. 22, 1952 |
| 2,696,564 | Ohmart | Dec. 7, 1954 |
| 2,782,337 | Robinson | Feb. 19, 1957 |

FOREIGN PATENTS

| | | |
|---|---|---|
| 773,689 | Great Britain | May 1, 1957 |